US010766188B2

(12) United States Patent
Fujino et al.

(10) Patent No.: US 10,766,188 B2
(45) Date of Patent: Sep. 8, 2020

(54) APPLYING METHOD FOR A FILM

(71) Applicant: 3M INNOVATIVE PROPERTIES COMPANY, St. Paul, MN (US)

(72) Inventors: Takayoshi Fujino, Sagamihara (JP); Masayuki Kubota, Hadano (JP); Hisataka Sawaki, Hadano (JP); Hirofumi Nitta, Hatano (JP)

(73) Assignee: 3M Innovative Properties Company, St. Paul, MN (US)

( * ) Notice: Subject to any disclaimer, the term of this patent is extended or adjusted under 35 U.S.C. 154(b) by 229 days.

(21) Appl. No.: 15/742,405

(22) PCT Filed: Jul. 11, 2016

(86) PCT No.: PCT/US2016/041707
§ 371 (c)(1),
(2) Date: Jan. 5, 2018

(87) PCT Pub. No.: WO2017/014972
PCT Pub. Date: Jan. 26, 2017

(65) Prior Publication Data
US 2018/0186063 A1 Jul. 5, 2018

(30) Foreign Application Priority Data
Jul. 17, 2015 (JP) .................................. 2015-142908

(51) Int. Cl.
*B29C 63/04* (2006.01)
*B29C 63/02* (2006.01)
(Continued)

(52) U.S. Cl.
CPC ........ *B29C 63/0073* (2013.01); *B29C 63/024* (2013.01); *B29C 63/04* (2013.01);
(Continued)

(58) Field of Classification Search
None
See application file for complete search history.

(56) References Cited

U.S. PATENT DOCUMENTS 5,324,384 A * 6/1994 Spengler ................. B29C 63/04
156/227
9,613,734 B2 * 4/2017 Suzuki ............. H01B 13/01236
(Continued)

FOREIGN PATENT DOCUMENTS

JP H6-238753 A 8/1994
JP 2005-54057 3/2005
(Continued)

OTHER PUBLICATIONS

International Search Report for PCT/US2016/041707, dated Dec. 7, 2016, (8 pages).

*Primary Examiner* — Barbara J Musser
(74) *Attorney, Agent, or Firm* — Philip P. Soo

(57) ABSTRACT

An applying device (1) and an applying method that can speedily perform application of a film (F) on an application target surface (S) and improve a quality of a finish. The applying device (1) is provided with a film support portion (2) that supports the film (F). The film support portion (2) is provided with a first support body and a second support body lined up in a first direction (Y), a film fixing mechanism that is provided on the first support body and the second support body and fixes the film along the first direction, and a first angle changing mechanism that changes an angle around an axis line extending so as to intersect the first direction between the first support body and the second support body. The invention also concerns a film applied to an application target surface.

7 Claims, 11 Drawing Sheets

(51) Int. Cl.
  *B29C 63/00*  (2006.01)
  *B32B 7/00*  (2019.01)
  *B29D 7/01*  (2006.01)
  B29L 31/30  (2006.01)
  B65H 37/00  (2006.01)

(52) U.S. Cl.
  CPC ............... *B29D 7/01* (2013.01); *B32B 7/00* (2013.01); *B29L 2031/3005* (2013.01); *B65H 37/002* (2013.01)

(56) References Cited

U.S. PATENT DOCUMENTS

| | | | |
|---|---|---|---|
| 2006/0151085 A1* | 7/2006 | Habisreitinger | B29C 63/02 156/54 |
| 2007/0227645 A1* | 10/2007 | Habisreitinger | B29C 63/02 156/160 |
| 2007/0284046 A1 | 12/2007 | Habisreitinger | |
| 2010/0078124 A1 | 4/2010 | Nickolaus, Jr. | |
| 2012/0024467 A1 | 2/2012 | Orchard | |
| 2016/0176173 A1* | 6/2016 | Kubota | B32B 37/0046 428/411.1 |
| 2017/0015090 A1* | 1/2017 | Kubota | B32B 37/10 |

FOREIGN PATENT DOCUMENTS

| | | |
|---|---|---|
| JP | 2005-119367 | 5/2005 |
| WO | WO 1999/19414 | 4/1999 |

\* cited by examiner

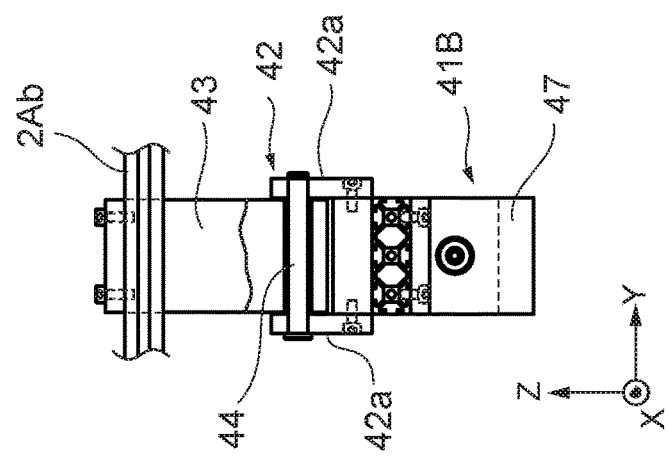
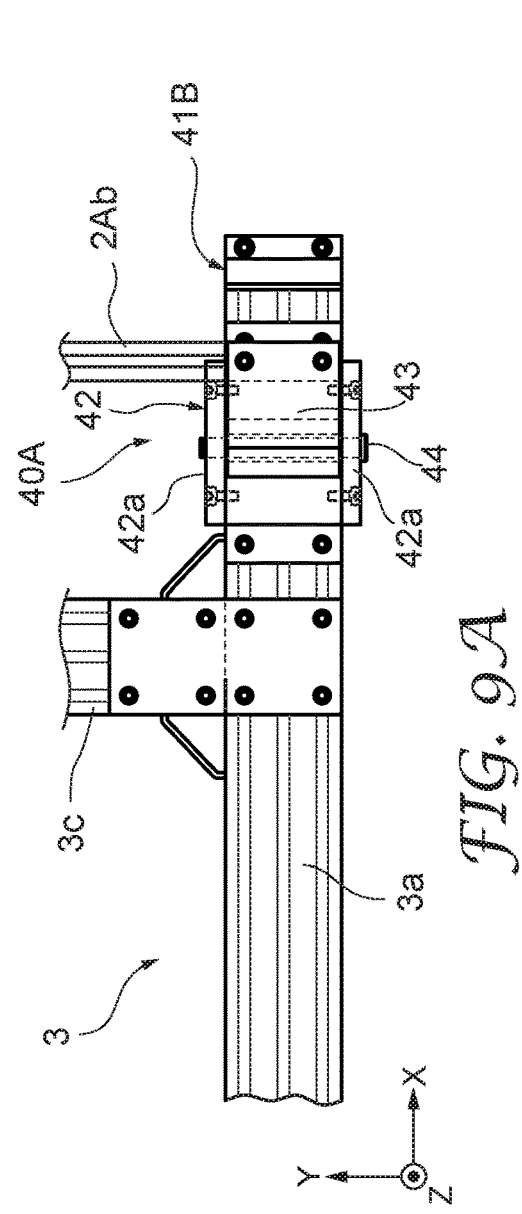
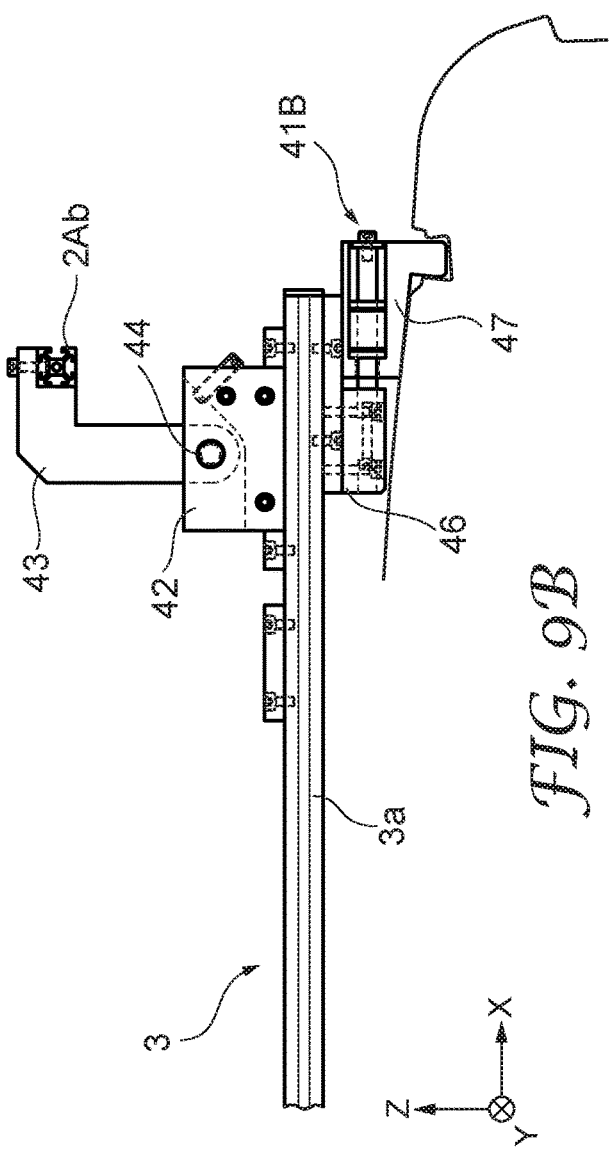
FIG. 9A
FIG. 9B
FIG. 9C

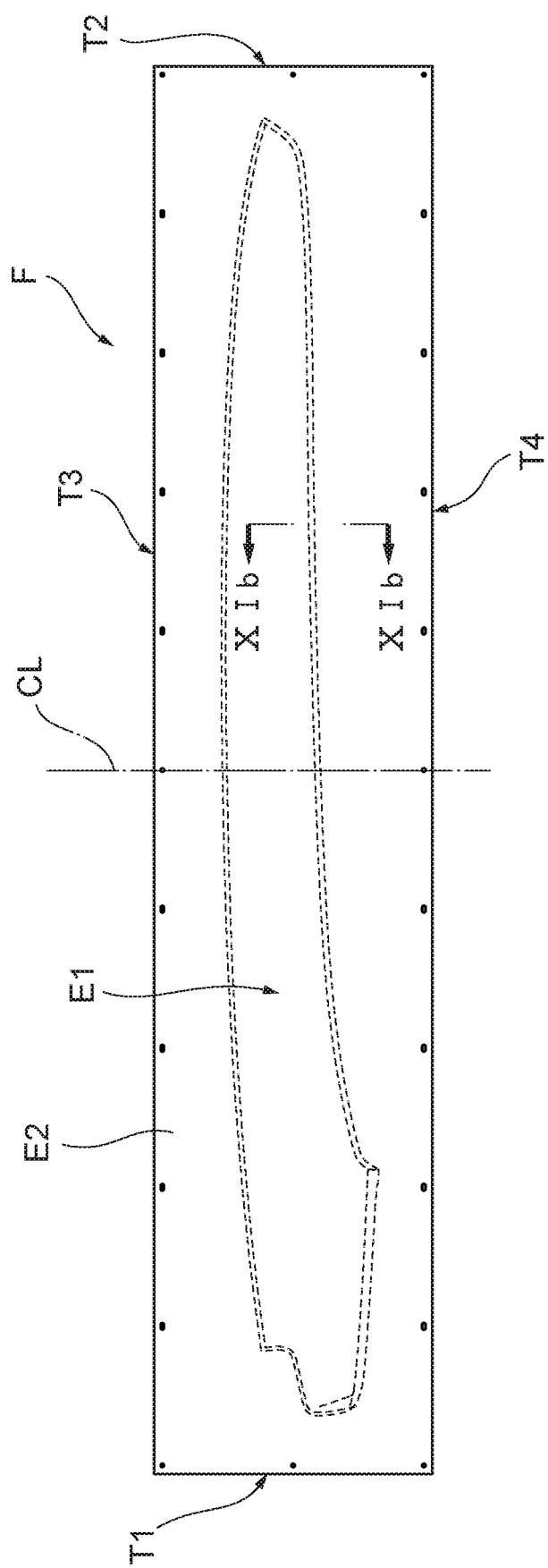

US 10,766,188 B2

APPLYING METHOD FOR A FILM

CROSS REFERENCE TO RELATED APPLICATIONS

This application is a national stage filing under 35 U.S.C. 371 of PCT/US2016/041707 filed Jul. 11, 2016, which claims the benefit of Japanese Patent Application No. 2015-142908, filed Jul. 17, 2015, the disclosures of which are incorporated by reference in their entirety herein.

FIELD

The present invention relates to an applying device for applying a film onto a surface, an applying method for applying a film onto a surface, and to such a film that can be applied onto a surface.

BACKGROUND

Conventionally, as illustrated in JP H6-238753A, for example, there is a situation of applying a film on a surface of a predetermined article (a bonnet of a vehicle in JP H6-238753A). Here, in recent years, there is a demand for applying the film on surfaces of articles of a wide width having all manner of shapes (for example, a roof of a vehicle or the like).

SUMMARY

Depending on a shape of an application target surface, in a situation where application of the film is performed in the method described above, the work is time consuming, and there is a possibility of room for improvement arising in a quality of a finish of the film after application. Therefore, there is a demand for speedily performing application of the film on the application target surface and improving the quality of the finish.

An applying device, according to one form of the present invention, is provided that applies a film on an application target surface of an application target object. The applying device comprises film support portion that supports the film. The film support portion is provided with a first support body and a second support body lined up in a first direction, a film fixing mechanism that is provided on the first support body and the second support body and fixes the film along the first direction, and a first angle changing mechanism that changes an angle around an axis line extending so as to intersect the first direction between the first support body and the second support body.

According to such a form of the present invention, the film support portion can support the film by the first support body and the second support body along the first direction. In this state, using the first angle changing mechanism, the angle around the axis line extending so as to intersect the first direction between the first support body and the second support body can be changed. Therefore, application of the film is enabled upon adjusting the angle between the first support body and the second support body to match a shape of the application target surface along the first direction. By the above, application of the film on the application target surface can be speedily performed, and a quality of a finish can be improved.

In an applying device according to another form of the present invention, the film support portion may be provided with a third support body on an opposite side of the second support body relative to the first support body, and a second angle changing mechanism that changes an angle around an axis line extending so as to intersect the first direction between the first support body and the third support body.

In an applying device according to another form of the present invention, a tension generation mechanism that imparts tension to the film supported by the film support portion may be provided on an end portion in the first direction of the film support portion.

In an applying device according to another form of the present invention, the first angle changing mechanism may change the angle between the first support body and the second support body into a first angle and a second angle less than the first angle.

An applying device according to another form of the present invention may be further provided with an installation portion installed to the application target. In this applying device, the first support body is disposed in a second direction intersecting the first direction on the installation portion and is rotatably supported by the installation portion.

An applying method according to one form of the present invention is provided for applying a film on an application target surface of an application target object. The applying method comprises an applying step of applying the film, which is supported by a film support portion provided with a first support body and a second support body lined up in a first direction, on the application target surface. The applying step is provided with a first step of applying the film on the application target surface by the first support body, and a second step of applying the film on the application target surface by changing an angle of the second support body relative to the first support body so as to bring the second support body closer to the application target surface.

According to such a form of the present invention, actions and effects similar to those of the applying device described above can be obtained.

In an applying method according to another form of the present invention, the film support portion may be provided with a third support body on an opposite side of the second support body relative to the first support body, the applying step may be provided with a third step of applying the film on the application target surface by the third support body, and the second step and the third step may be executed after the first step.

A film according to one form of the present invention is a film applied to an application target surface of an application target object. The film is provided with an application film, a substrate layer, and an adhesive layer in this order and extends in a longitudinal direction. The film has an applying region applied on the application target surface and a non-applying region not applied on the application target surface. The film has, in the non-applying region, a support target portion formed on both end portions along the longitudinal direction and a fixing target portion formed on both end portions in the longitudinal direction.

According to such a form, it becomes possible to perform speedy application on the application target surface using an applying device such as is described above. Moreover, because the fixing target portion is formed on both end portions in the longitudinal direction and the support target portion is formed on both end portions along the longitudinal direction, adjustment of tension in the longitudinal direction of the film becomes possible.

In a film according to another form of the present invention, the support target portion may have a plurality of through holes for support formed in both end portions along the longitudinal direction, a through hole disposed in a reference position in the longitudinal direction may be configured by a circular hole, and a through hole disposed in a position other than the reference position in the longitudinal direction may be configured by a long hole extending along the longitudinal direction.

According to one aspect of the present invention, application of a film on an application target surface can be speedily performed, and a quality of a finish can be improved.

BRIEF DESCRIPTION OF DRAWINGS

FIG. 9 is an enlarged view of a rotating portion of an installation portion: (a) is an enlarged view viewed from the Z-axis positive side, (b) is an enlarged view viewed from a Y-axis negative side, and (c) is an enlarged view viewed from an X-axis positive side.

FIG. 10 is a plan view illustrating a film.

DESCRIPTION OF EMBODIMENTS

An embodiment of the present invention is described in detail below with reference to the attached drawings. Note that in describing the drawings, identical or equivalent elements are labeled with the same reference sign, and redundant description is omitted.

Figures 1A, 1B:
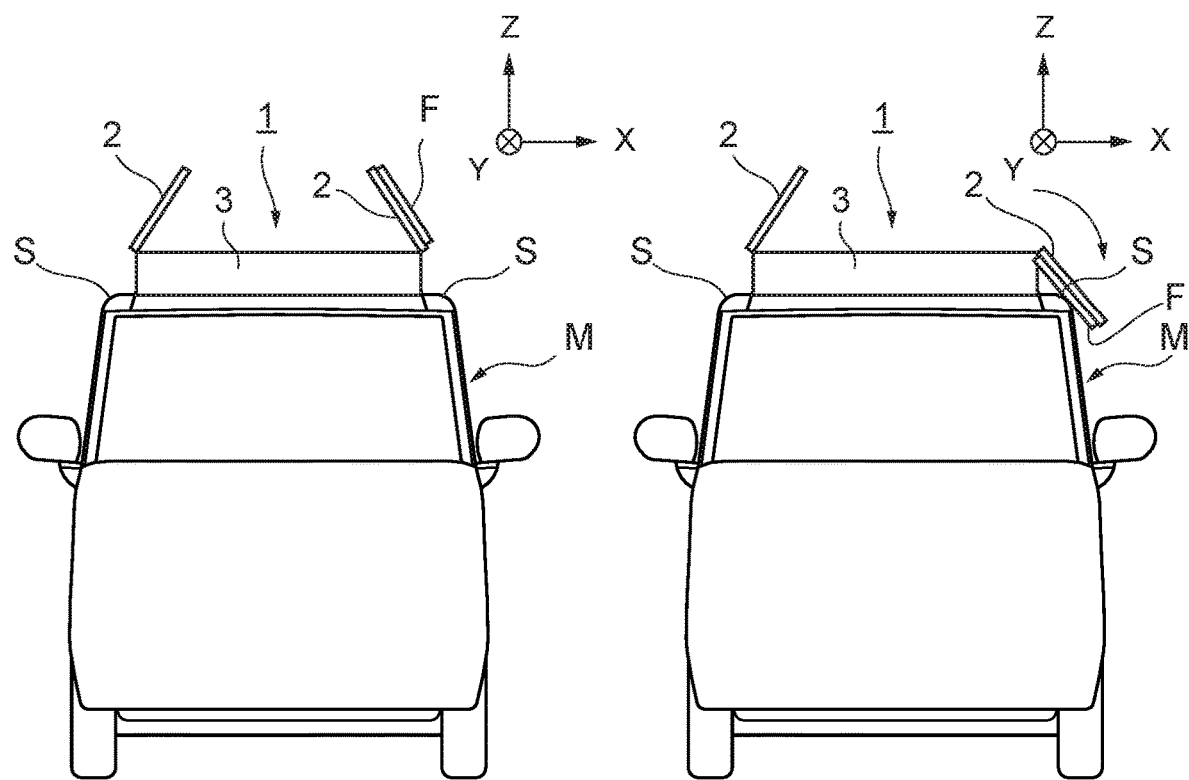
FIG. 1 is a schematic configuration view of an applying device according to an embodiment of the present invention.
Figure 1C:
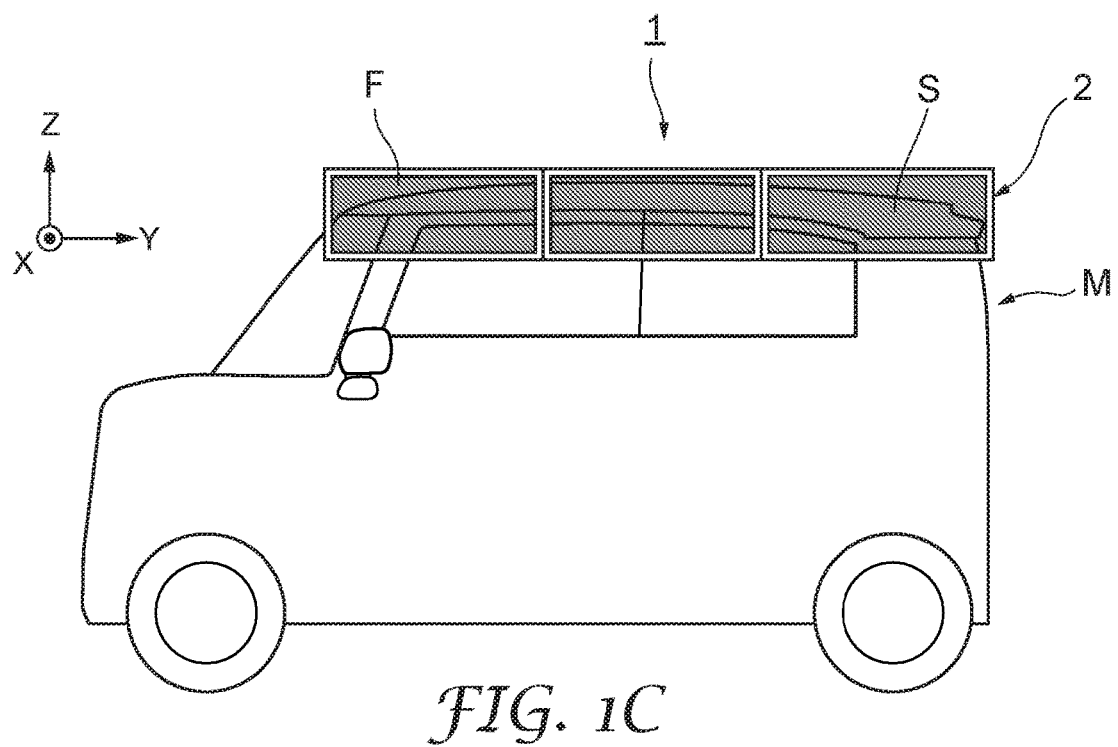

A schematic configuration of an applying device 1 according to an embodiment of the present invention is described with reference to FIG. 1. As illustrated in FIG. 1(a), (b), the applying device 1 is a device that applies a film F on an application target surface S of an application target object M. In the present embodiment, an automobile is adopted as the application target object M. Moreover, both end portions in a vehicle width direction of a roof is adopted as the application target surface S. Here, in the description below, a front-rear direction of the automobile is defined as a Y-axis direction (first direction), the vehicle width direction is defined as an X-axis direction (a second direction intersecting the first direction), and an up-down direction is defined as a Z-axis direction. A rear of the automobile is defined as a Y-axis positive side, a right side when viewing the automobile from the front is defined as an X-axis positive side, and upward is defined as a Z-axis positive side. The applying device 1 is provided with a pair of support portions 2 supporting the film F and an installation portion 3 installed to the application target object M. The pair of film support portions 2 is rotatably supported on both sides in the X-axis direction of the installation portion 3. The film support portion 2 is divided into a plurality of regions (here, three) in the Y-axis direction. Note that a division count of the film support portion 2 is not limited in particular.

Figure 2:
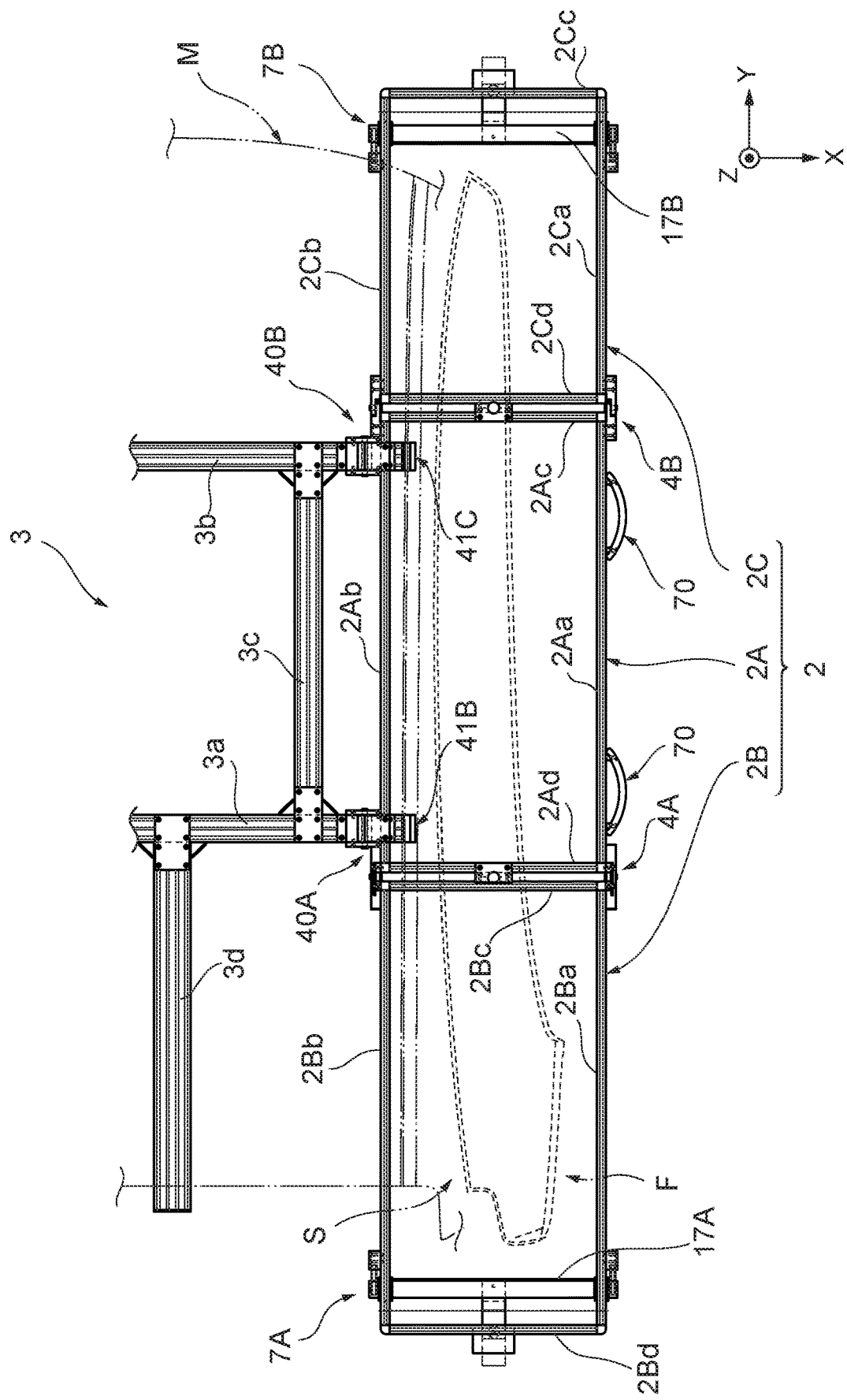
FIG. 2 is a plan view of the applying device according to an embodiment of the present invention.
Figure 3:
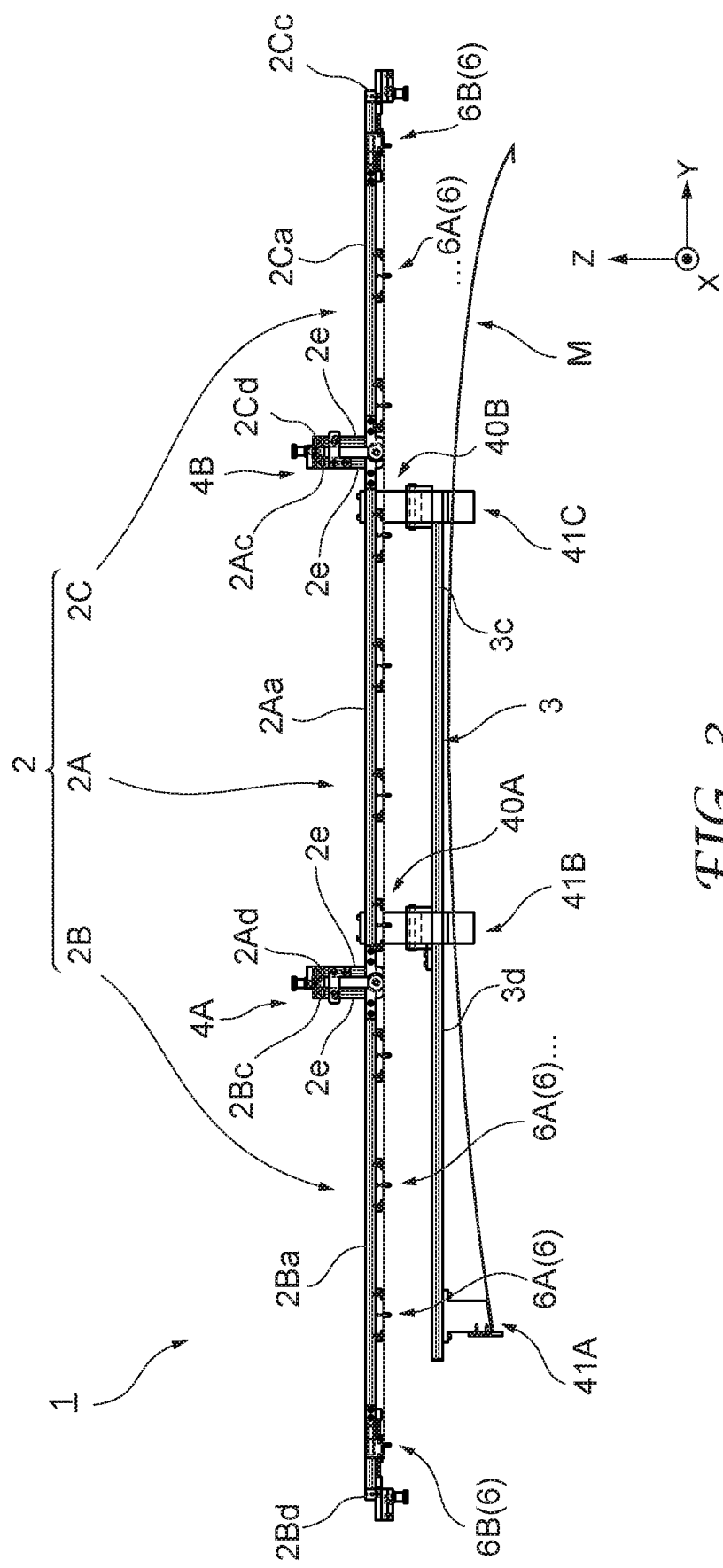
FIG. 3 is a side view of the applying device according to an embodiment of the present invention.

Next, a detailed configuration of the applying device 1 according to an embodiment of the present invention is described with reference to FIG. 2 to FIG. 9. As illustrated in FIG. 2 and FIG. 3, the film support portion 2 is provided with a first support body 2A, a second support body 2B, and a third support body 2C lined up in the Y-axis direction; a first angle changing mechanism 4A and a second angle changing mechanism 4B; a film fixing mechanism 6; and a first tension generation mechanism 7A and a second tension generation mechanism 7B. Each diagram illustrates a posture when the film support portion 2 is supporting the film F spread in a horizontal direction. In the following description, unless otherwise noted, a disposition and the like of each component are described with the film support portion 2 in this posture.

As illustrated in FIG. 2 and FIG. 3, the second support body 2B is disposed so as to line up on a Y-axis negative side of the first support body 2A. The third support body 2C is disposed so as to line up on the Y-axis positive side that is an opposite side of the second support body 2B relative to the first support body 2A. That is, the second support body 2B, the first support body 2A, and the third support body 2C are lined up in this order heading toward the Y-axis positive side. Each support body 2A, 2B, 2C is a rectangular frame member configured by frame members respectively disposed on the four sides thereof. The support bodies 2A, 2B, 2C are provided with frame members 2Aa, 2Ba, 2Ca disposed on the X-axis positive side; frame members 2Ab, 2Bb, 2Cb disposed on an X-axis negative side; 2Ac, 2Bc, 2Cc disposed on the Y-axis positive side; and frame members 2Ad, 2Bd, 2Cd disposed on the Y-axis negative side. However, the frame members 2Ad, 2Bc lined up in parallel adjacent to each other are disposed more on the Z-axis positive side than the other frame members by a member 2e extending in the Z-axis direction. The frame members 2Ac, 2Cd lined up in parallel adjacent to each other are also disposed more on the Z-axis positive side than the other frame members by the member 2e extending in the Z-axis direction.

Dimensions in the X-axis direction of each support body 2A, 2B, 2C are mutually identical. Dimensions in the Y-axis direction of each support body 2A, 2B, 2C are mutually different: the first support body 2A is the longest, and the third support body 2C is the shortest. However, the dimensions in the Y-axis direction of each support body 2A, 2B, 2C can be suitably changed and may be mutually identical. By such a configuration, the film support portion 2 configures overall a rectangular frame body whose longitudinal direction is the Y-axis direction.

Figure 4:
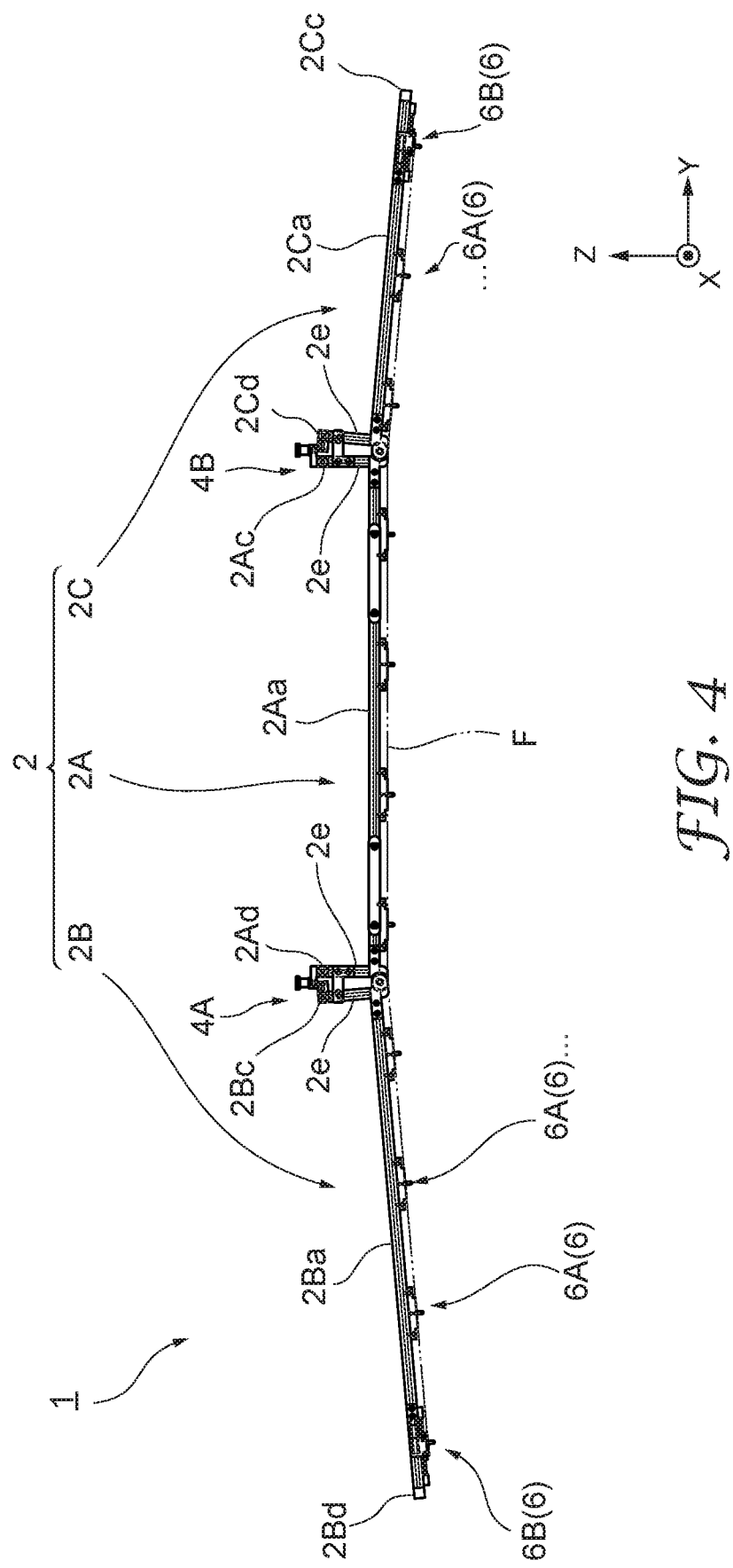
FIG. 4 is a side view of a film support portion in a situation where angle adjustment is performed.

The first angle changing mechanism 4A is a mechanism that changes an angle around an axis line extending so as to intersect the Y-axis direction (an axis line extending in the X-axis direction in this posture; however, an extending direction differs according to posture) between the first support body 2A and the second support body 2B. The first angle changing mechanism 4A is provided between the first support body 2A and the second support body 2B—that is, near the frame members 2Ad, 2Bc. The second angle changing mechanism 4B is a mechanism that changes an angle around an axis line extending so as to intersect the Y-axis direction (an axis line extending in the X-axis direction in this posture; however, an extending direction differs according to posture) between the first support body 2A and the third support body 2C. The second angle changing mechanism 4B is provided between the first support body 2A and the third support body 2C—that is, near the frame members 2Ac, 2Cd. The first angle changing mechanism 4A rotates to a Z-axis negative side around the axis line the second support body 2B relative to the first support body 2A. By this, as illustrated in FIG. 3, the angle between the first support body 2A and the second support body 2B slightly decreases as illustrated in FIG. 4 from a state of 180°. That is, the first angle changing mechanism 4A changes the angle between the first support body 2A and the second support body 2B into the first angle (180°) and a second angle less than the first angle. The second angle changing mechanism 4B rotates to the Z-axis negative side around the axis line the third support body 2C relative to the first support body 2A. By this, as illustrated in FIG. 3, the angle between the first support body 2A and the third support body 2C slightly decreases as illustrated in FIG. 4 from a state of 180°. That is, the second angle changing mechanism 4B changes the angle between the first support body 2A and the third support body 2C to the first angle (180°) and a third angle less than the first angle. Note that 1 to 30° may be set as the second angle and the third angle. The second angle and the third angle may be 1 to 20° or 1 to 10°.

Figures 6A, 6B:
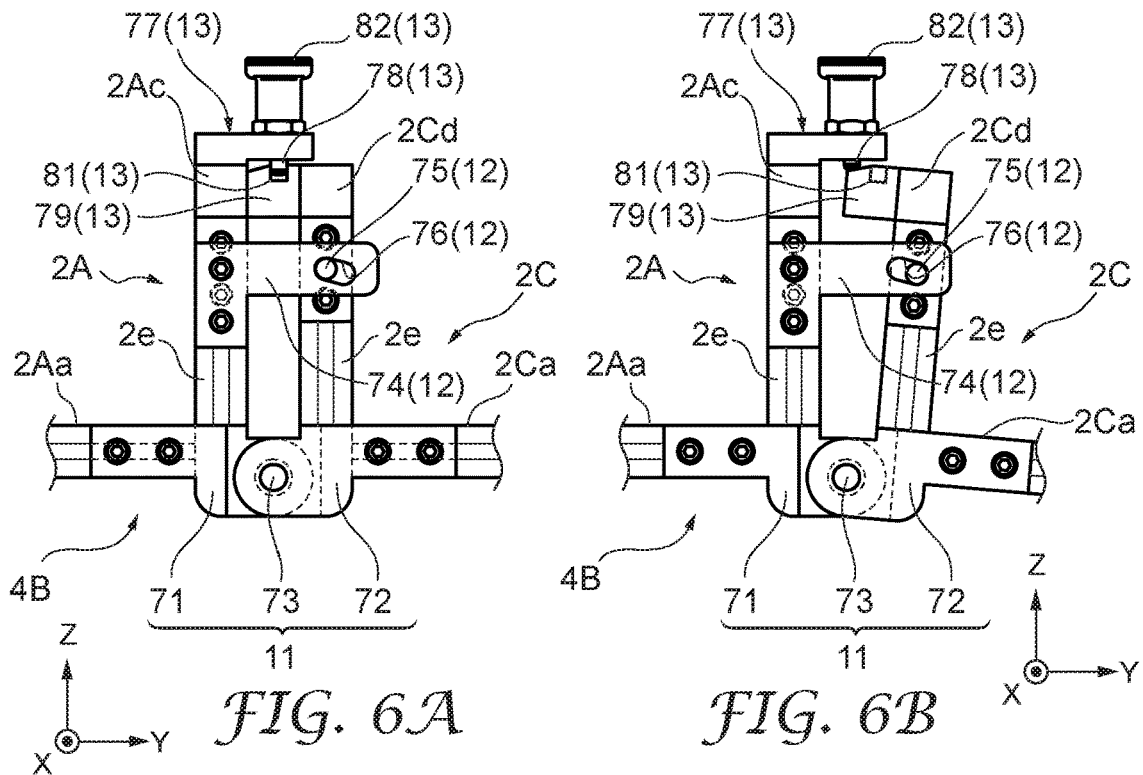
FIG. 6 is an enlarged view of a second angle adjustment portion: (a) is an enlarged view of the state illustrated in FIG. 3, (b) is an enlarged view of a state corresponding to FIG. 4, and (c) is an enlarged view of when the second angle adjustment portion is viewed from a Z-axis positive side.
Figure 6C:
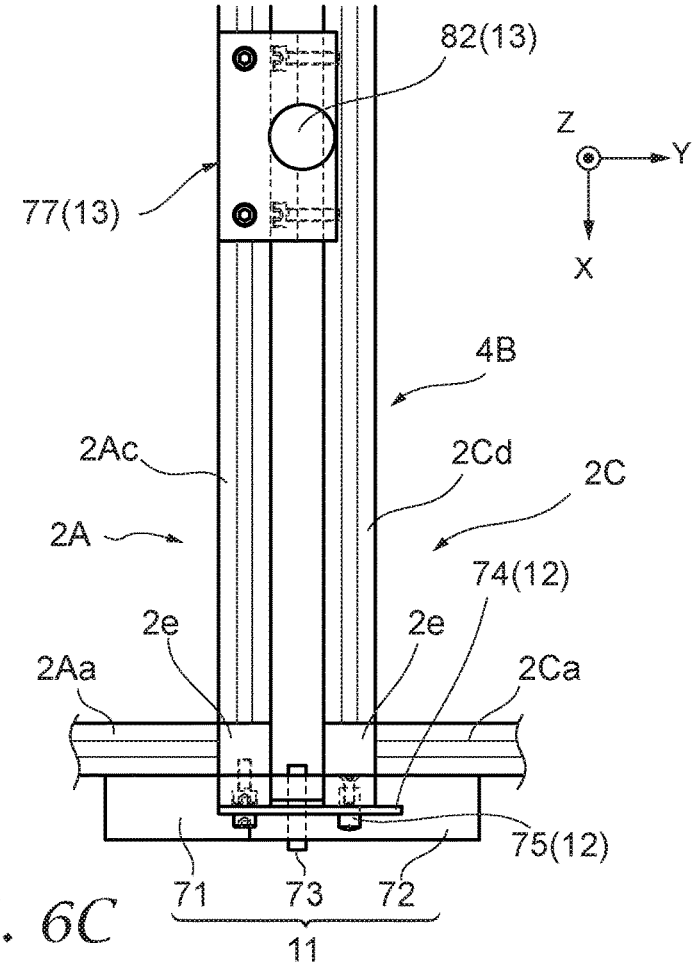

The second angle changing mechanism 4B is described in detail with reference to FIG. 6. Note that description of the first angle changing mechanism 4A is omitted because the first angle changing mechanism 4A has a configuration of the same purpose as the second angle changing mechanism 4B. As illustrated in FIG. 6, the second angle changing mechanism 4B is provided with a hinge portion 11, a guide portion 12, and a stopper portion 13. In FIG. 6, within the second angle changing mechanism 4B, a hinge portion 11 and a guide portion 12 on the X-axis positive side are illustrated; however, a hinge portion 11 and a guide portion 12 of a similar configuration are also provided on the X-axis negative side. The hinge portion 11 is provided with a rotating member 71 connected to the frame member 2Aa of the first support body 2A, a rotating member 72 connected to the frame member 2Ca of the third support body 2C, and a shaft 73 that axially supports the rotating member 71 and the rotating member 72. A centerline of this shaft 73 is the axis line in the second angle changing mechanism 4B. Note that this axis line does not have to be straight relative to the Y-axis direction and may incline at a predetermined angle to intersect the Y-axis direction. With the rotating member 71 and the rotating member 72, portions are stacked on each other, and the shaft 73 is inserted so as to extend in the X-axis direction in this stacked portion.

The guide portion 12 is provided in an intermediate position of a pair of members 2e extending in the Z-axis direction. Specifically, the guide portion 12 is provided with a projecting piece 74 that is fixed to one member 2e (here, on the Y-axis negative side) and extends in the Y-axis direction to the one member 2e and a protruding portion 75 that projects in the X-axis direction from the other member 2e (here, on the Y-axis positive side). However, the projecting piece 74 may be provided on the other member 2e, and the protruding portion 75 may be provided on the one member 2e. An oval through hole 76 is provided in the projecting piece 74, and the protruding portion 75 is inserted into this through hole 76. The oval through hole 76 extends in the Y-axis direction and is inclined so as to be positioned on the Z-axis negative side in heading toward the Y-axis positive side. As illustrated in FIG. 6(a), in the state where the angle between the first support body 2A and the third support body 2C is 180°, the protruding portion 75 is positioned at an edge portion on the Y-axis negative side of the oval through hole 76. As illustrated in FIG. 6(b), in a situation where the angle between the first support body 2A and the third support body 2C is changed due to rotation at the hinge portion 11, the protruding portion 75 is positioned at an edge portion on the Y-axis positive side of the oval through hole 76.

The stopper portion 13 is provided in a central position in the X-axis direction of the frame members 2Ac, 2Cd. The stopper portion 13 is provided with a support piece 77 that is provided on the frame member 2Ac and extends to the Y-axis positive side, a protruding portion 78 projecting from a surface on the Z-axis negative side of the support piece 77, a receiving portion 79 that extends from the frame member 2Cd to the Y-axis negative side and is stacked on the support piece 77 on the Z-axis negative side, and a groove portion 81 that is formed in the receiving portion 79 and can receive the protruding portion 78. The protruding portion 78 is linked to a handle portion 82 provided on the Z-axis positive side of the support piece 77, and a projection amount of the protruding portion 78 can be changed by a worker operating the handle portion 82. As illustrated in FIG. 6(a), in the state where the angle between the first support body 2A and the third support body 2C is 180°, by the protruding portion 78 being housed in the groove portion 81, the protruding portion 78 and the groove portion 81 are engaged and rotation at the hinge portion 11 is regulated. As illustrated in FIG. 6(b), in a situation where by the worker operating the handle portion 82 the angle between the first support body 2A and the third support body 2C changes a projection force of the protruding portion 78 due to rotation at the hinge portion 11, by the protruding portion 78 being pulled into the support piece 77, the engagement between the protruding portion 78 and the groove portion 81 is released. By this, rotation at the hinge portion 11 is performed.

The film fixing mechanism 6 is a mechanism that fixes the film F along the Y-axis direction. The film fixing mechanism 6 is provided on the first support body 2A, the second support body 2B, and the third support body 2C. The film fixing mechanism 6 is provided with a long-side portion 6A that makes an edge portion on a long-side side of the film F fixable and a short-side portion 6B that makes an edge portion on a short-side side of the film F fixable. Note that "fixable" here indicates that while an edge portion of the film F can be fixed in shaping a through hole on a film F side, in shaping the through hole, an end portion of the film F may come to be supported (and not fixed). In the present embodiment, the long-side portion 6A comes to support an end portion on the long-side side of the film F.

The long-side portion 6A of the film fixing mechanism 6 is configured by a plurality of protruding portions provided on an edge portion on a long-side side of the film support portion 2, and the short-side portion 6B is configured by a plurality of protruding portions provided on an edge portion on a short-side side of the film support portion 2 (see FIGS. 2, 3). The protruding portions configuring the long-side portion 6A and the protruding portions configuring the short-side portion 6B are formed in positions corresponding to through holes on the long-side side and through holes on the short-side side of the film F in FIG. 10(a) that are described below. That is, on long-side sides on both sides in the X-axis direction, nine protruding portions of the long-side portion 6A are respectively formed, and on short-side sides on both sides in the Y-axis direction, three protruding portions of the short-side portion 6B are respectively formed. Note that a numerical amount and a disposition of the protruding portions are not limited in particular. Each protruding portion is a cylindrical member that projects to the Z-axis negative side from a surface on the Z-axis negative side of each member. Specifically, the short-side portion 6B of the film fixing mechanism 6 is provided on the frame members 2Aa, 2Ba, 2Ca on the X-axis positive side and the frame members 2Ab, 2Bb, 2Cb on the X-axis negative side of the support bodies 2A, 2B, 2C.

The short-side portion 6B of the film fixing mechanism 6 is respectively provided to movable members 17A, 17B provided on both end portions in the Y-axis direction of the film support portion 2. The movable member 17A is provided so as to extend in the X-axis direction between the frame members 2Ba, 2Bb on an end-portion side on the Y-axis negative side of the second support body 2B. The movable member 17A is provided separated to the Y-axis positive side from the frame member 2Bd. The movable member 17A is a member that can move in the Y-axis direction by the first tension generation mechanism 7A that is described below. The movable member 17B is provided so as to extend in the X-axis direction between the frame members 2Ca, 2Cb on an end-portion side on the Y-axis positive side of the third support body 2C. The movable member 17B is provided separated to the Y-axis negative side from the frame member 2Cc. The movable member 17B is a member that can move in the Y-axis direction by the second tension generation mechanism 7B that is described below.

As illustrated in FIG. 2, the first tension generation mechanism 7A is provided on an edge portion on the Y-axis negative side in the Y-axis direction of the film support portion 2 and is a mechanism that imparts tension to the film F supported by the film support portion 2. The first tension generation mechanism 7A imparts tension to the film F by moving to the Y-axis negative side the movable member 17A that fixes the short-side portion of the film F. The second tension generation mechanism 7B is provided on an edge portion on the Y-axis positive side in the Y-axis direction of the film support portion 2 and is a mechanism that imparts tension to the film F supported by the film support portion 2. The second tension generation mechanism 7B imparts tension to the film F by moving to the Y-axis negative side the movable member 17B that fixes the short-side portion of the film F.

The first tension generation mechanism 7A is described in detail with reference to FIG. 7 and FIG. 8. Note that description of the second tension generation mechanism 7B is omitted because the second tension generation mechanism 7B has a configuration of the same purpose as the first tension generation mechanism 7A. The first tension generation mechanism 7A is provided with a slide portion 21 that slides in the Y-axis direction the movable member 17A that can fix the short-side portion of the film F, a guide portion 22 that guides movement in the Y-axis direction of the movable member 17A at an end portion in the X-axis direction, and a guide portion 23 that guides movement in the Y-axis direction of the movable member 17A in a central position in the X-axis direction. Note that in FIG. 7, only a slide portion 21 and a guide portion 22 on the X-axis negative side are illustrated; however, a slide portion 21 and a guide portion 22 on the X-axis positive side have a configuration of the same purpose.

Figure 7:
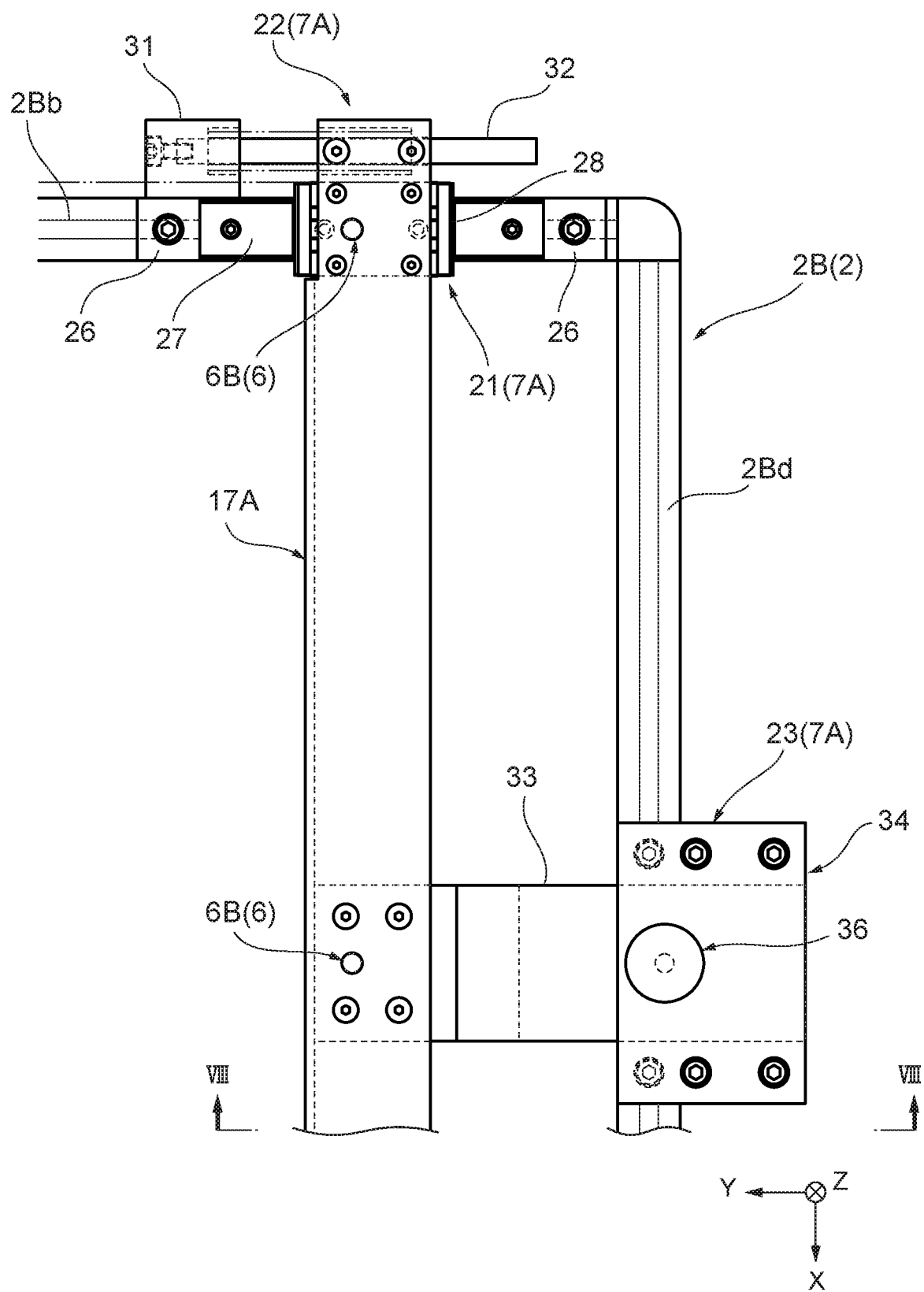
FIG. 7 is an enlarged view of when a first tension generation mechanism is viewed from a Z-axis negative side.
Figure 8A:
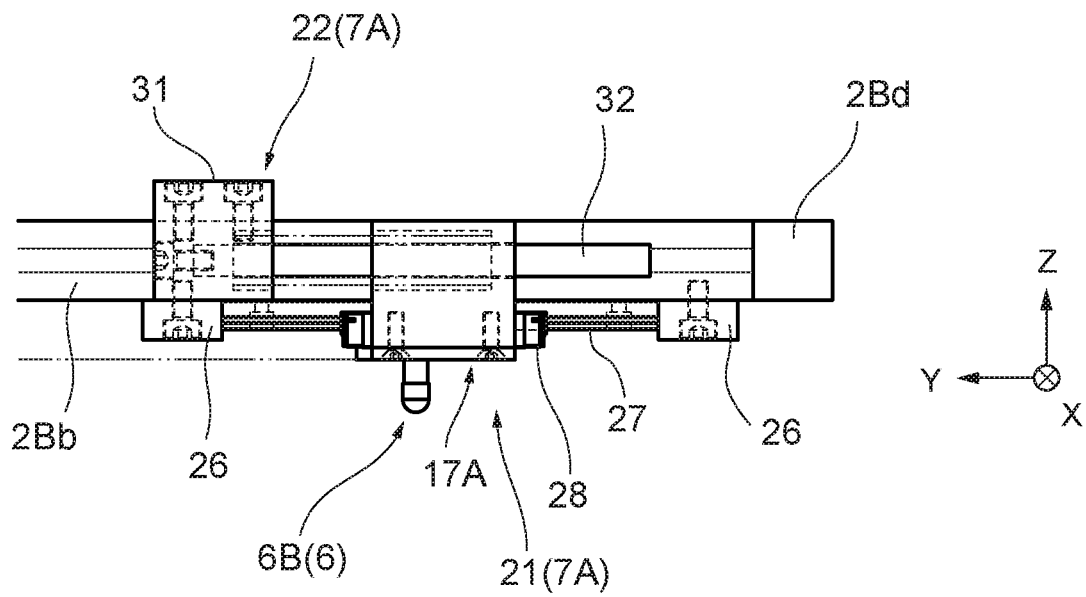
FIG. 8 is an enlarged view of the first tension generation mechanism: (a) is an enlarged view of when it is viewed from an X-axis negative side, and (b) is an enlarged cross-sectional view along line VIIIb-VIIIb illustrated in FIG. 7.

As illustrated in FIG. 7 and FIG. 8(a), the slide portion 21 is provided on a surface on the Z-axis negative side of the frame member 2Bb on the X-axis negative side of the second support body 2B and is a mechanism that moves back and forth in the Y-axis direction an end portion on the X-axis negative side of the movable member 17A. The slide portion 21 is provided with a pair of support members 26 separated from each other in the Y-axis direction, a rail member 27 that bridges the pair of support members 26 and extends in the Y-axis direction, and a slide member 28 that is fixed to an end portion of the movable member 17A and can move back and forth along the rail member 27. The rail member 27 has a plate-like shape extending in the Y-axis direction and is disposed in a position separated to the Z-axis negative side from a surface on the Z-axis negative side of the frame member 2Bb by being supported by the support member 26.

As illustrated in FIG. 7 and FIG. 8(a), the guide portion 22 is provided on a surface on the X-axis negative side of the frame member 2Bb on the X-axis negative side of the second support body 2B and is a mechanism that guides movement back and forth in the Y-axis direction of the end portion on the X-axis negative side of the movable member 17A (portion further on the X-axis negative side than the slide portion 21). The guide portion 22 is provided with a support member 31 provided on the surface on the X-axis negative side of the frame member 2Bb and a guide member 32 extending to the Y-axis negative side along the Y-axis direction from the support member 31. The guide member 32 is disposed in a position separated to the X-axis negative side from the frame member 2Bb in a position adjacent to the slide portion 21. The guide member 32 is inserted through the end portion on the X-axis negative side of the movable member 17A.

Figure 8B:
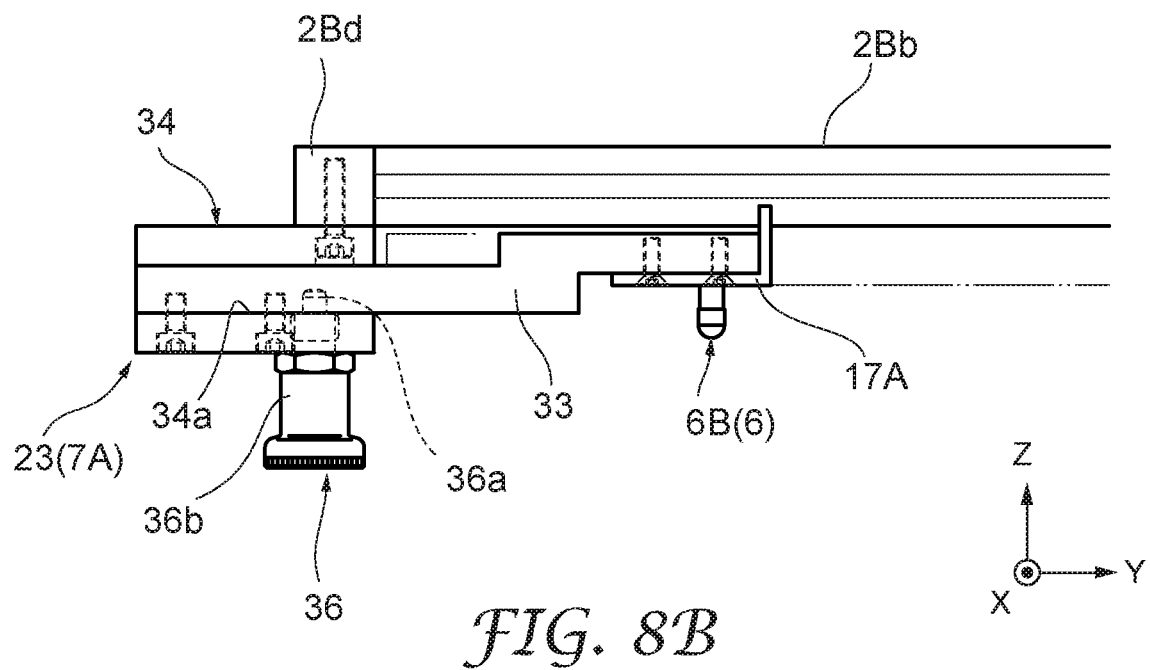

As illustrated in FIG. 7 and FIG. 8(b), the guide portion 32 is provided with a guiding target member 33 that is provided in a central position in the X-axis direction of the movable member 17A and extends toward the Y-axis negative side, a guide member 34 that is provided on the frame member 2Bd on the Y-axis negative side of the second support body 2B and guides the guiding target member 33, and a positioning portion 36 that is provided on the guide member 34 and fixes and positions the guiding target member 33. The guiding target member 33 is a plate-like member extending to a frame-member 2Bd side on the Y-axis negative side from the moveable member 17A and has a tip portion vicinity on the Y-axis negative side inserted into the guide member 34. The guide member 34 has a shape of a rectangular annular cross section and has a through portion 34a that is opened in the Y-axis direction so as to receive the guiding target member 33. The positioning portion 36 is provided with a projecting portion 36 that projects into the through portion 34a of the guide member 34 and a handle portion 36b that can adjust a projection amount of the projection portion 36a. The positioning portion 36 performs positioning of the movable member 17A by fixing the guiding target member 33 by the projecting portion 36a after imparting tension to the film F by being slid by the sliding portion 21.

Next, a configuration of the installation portion 3 is described with reference to FIG. 2, FIG. 3, FIG. 5, and FIG. 9. The installation portion 3 is installed to the application target object M and supports each support body 2 on both sides in the X-axis direction. The first support body 2A of the film support portion 2 is disposed in the X-axis direction on the installation portion 3 and is rotatably supported by the installation portion 3. The installation portion 3 is a frame body where a plurality of frame members is combined and in the present embodiment is provided with frame members 3a, 3b that extend in the X-axis direction opposing each other in the Y-axis direction; a pair of frame members 3c that extends in the Y-axis direction opposing each other in the X-axis direction so as to link the frame members 3a, 3b (note that another frame member is omitted in FIG. 2), and a frame member 3d that extends toward the Y-axis negative side from the frame member 3a on the Y-axis negative side. The frame member 3d is provided in a central position in the X-axis direction of the frame member 3a. Moreover, the installation portion 3 is provided with rotating portions 40A, 40B that rotatably support the film support portion 2 and installation fittings 41A, 41B, 41C for installing the installation portion 3 to the application target object M.

The installation fitting 41A is provided on a tip portion on the Y-axis negative side of the frame member 3d and is installed to a portion on a front-end side of a roof portion on the Y-axis negative side of the application target object M. The installation fitting 41A is a fitting that projects toward the Z-axis negative side from a surface on the Z-axis negative side of the frame member 3d. The installation fitting 41B is a fitting provided on an end portion on the X-axis positive side of the frame member 3a and installed near an end portion on the X-axis positive side of the application target object M. The installation fitting 41B is provided with a member 46 that projects toward the Z-axis negative side from a surface on the Z-axis negative side of the frame member 3a and a linking member 47 that extends to the X-axis positive side from the member 46 and is linked to the application target object M in a state where a position in the X-axis direction is adjustable (see FIG. 9). The linking member 47 is linked by being fitted into a groove portion provided in the roof portion of the application target object M. The installation fitting 41C is a fitting that is provided on an end portion on the X-axis positive side of the frame member 3b and installed near the end portion on the X-axis positive side of the application target object M. The installation fitting 41C has a configuration of the same purpose as the installation fitting 41B.

Figure 5:
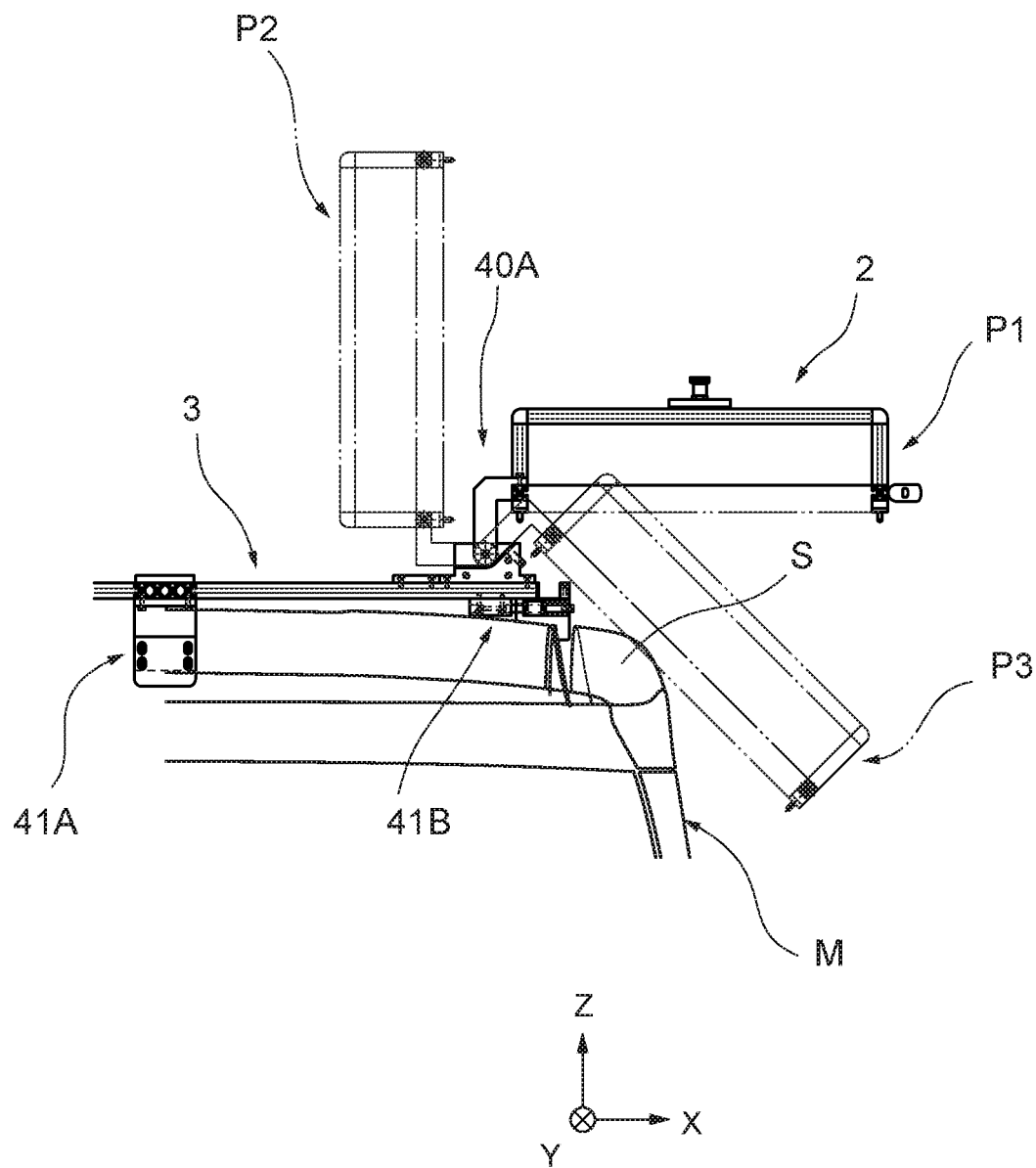
FIG. 5 is a front view of the applying device according to an embodiment of the present invention.

The rotating portion 40A is provided on the end portion on the X-axis positive side of the frame member 3a and is rotatably linked to the frame member 2Ab of the first support body 2A. The rotating portion 40B is provided on the end portion on the X-axis positive side of the frame member 3b and is rotatably linked to the frame member 2Ab of the first support body 2A. As illustrated in FIG. 5 for example, the rotating portions 40A, 40B can rotate the film support portion 2 between a position P2 where the film support portion 2 is lifted in the Z-axis positive direction and a position P3 of the film support portion 2 where the film F can cover the application target surface S.

A configuration of the rotating portion 40A is described in detail with reference to FIG. 9. Note that description of the rotating portion 40B is omitted because the rotating portion 40B has a configuration of the same purpose as the rotating portion 40A. As illustrated in FIG. 9, the rotating portion 40A is provided with a base portion 42 provided on a surface on the Z-axis positive side of the frame member 3a, an arm portion 43 linked to the frame member 2Ab of the film support portion 2 rotatably supported by the base portion 42, and a shaft 44 that rotatably links the base portion 42 and the arm portion 43. By a groove being provided in a region on the Z-axis positive side of the base portion 42, a pair of wall portions 42a opposing each other in the Y-axis direction is formed so as to interpose the arm portion 43. The arm portion 43 is L-shaped when viewed from the Y-axis direction (see in particular FIG. 9(b)). The arm portion 43 extends from the base portion 42 to the Z-axis positive side, is bent to the X-axis positive side, and supports the frame member 2Ab of the film support portion 2 at a tip portion. Moreover, the arm portion 43 is interposed by the pair of wall portions 42a of the base portion 42 and has the shaft 44 inserted in the Y-axis direction at a position of being interposed by these wall portions 42a (see in particular FIG. 9(c)). Note that a handle portion 70 is provided on the frame member 2Aa of the first support body 2A. When collapsing the film support portion 2, the worker can easily collapse the film support portion 2 by gripping the handle portion 70, and when installing the film, the worker can easily adjust a pressing force by operating the handle portion 70.

Next, a configuration of the film F is described with reference to FIG. 10 and FIG. 11. As illustrated in FIG. 10, the film F has a rectangular shape extending in the longitudinal direction. The film F has an applying region E1 applied to the application target surface S and a non-applying region E2 not applied to the application target surface S. The applying region E1 of the film F is set to a shape corresponding to a shape of the application target surface S; in the present embodiment, the shape illustrated by the dashed line on the inner-peripheral side in the diagram corresponds to the applying region E1. A region other than the applying region E1 corresponds to the non-applying region.

Figure 11A:
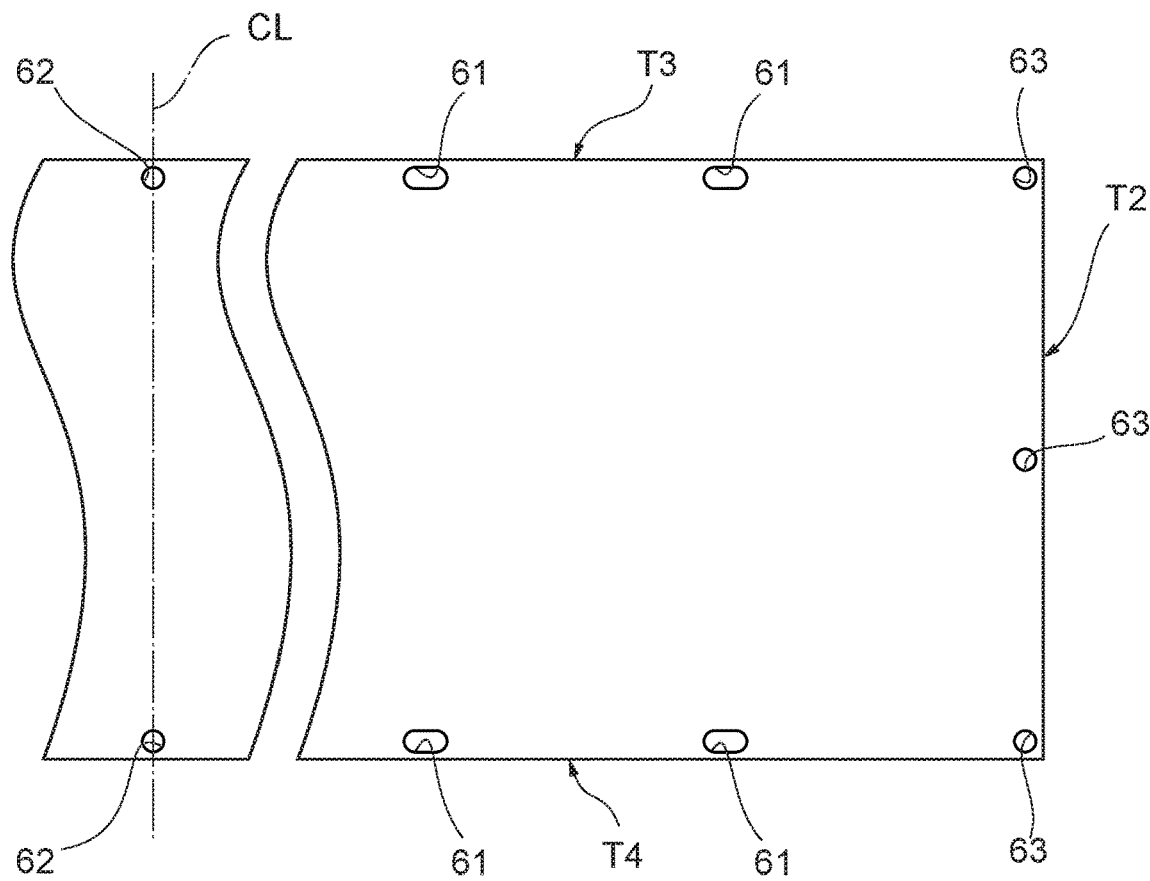
FIG. 11 is a schematic view illustrating the film: (a) is a schematic view illustrating a through hole near an end portion in a longitudinal direction, and (b) is a schematic cross-sectional view along line XIb-XIb illustrated in FIG. 10.

In the non-applying region E2, support target portions T3, T4 are formed on both end portions along the longitudinal direction and fixing target portions T1, T2 are formed on both end portions in the longitudinal direction. The support target portions T3, T4 have a plurality of through holes for support formed in both end portions along the longitudinal direction, and the fixing target portions T1, T2 have a plurality of through holes for fixing formed in both end portions in the longitudinal direction. Specifically, as illustrated in FIG. 11(a), in the support target portions T3, T4, a through hole 62 disposed in a reference position CL in the longitudinal direction is configured by a circular hole. Meanwhile, a through hole 61 disposed in a position other than the reference position CL in the longitudinal direction is configured by a long hole extending along the longitudinal direction. Note that the reference position CL is set to a substantially central position in the longitudinal direction of the film F. In the fixing target portion T2, a through hole 63 disposed in the end portion in the longitudinal direction is configured by a circular hole (the fixing target portion T1 that is not illustrated is of a similar configuration).

By the above configuration, in the fixing target portions T1, T2, the cylindrical protruding portion configuring the short-side portion 6B of the film fixing mechanism 6 is inserted in the circular through hole 63. A position of the through hole 63 of the film F is fixed by the protruding portion, and the through hole 63 of the film F cannot move in any direction. Therefore, when the movable members 17A, 17B move due to the tension generation mechanisms 7A, 7B, the fixing target portions T1, T2 move in conjunction with this movement. In the support target portions T3, T4, the cylindrical protruding portion configuring the long-side portion 6A of the film fixing mechanism 6 is inserted in the circular through hole 62 in the reference position CL and the through hole 63 that is the long hole. The position of the through hole 62 in the reference position CL of the film F is fixed by the protruding portion; meanwhile, because the through hole 61 is a long hole extending in the longitudinal direction, minute movement in the longitudinal direction along the protruding portion is possible. Therefore, when the movable members 17A, 17B move due to the tension generation mechanisms 7A, 7B, slight position adjustment of the support target portions T3, T4 is possible in a range of a size in the longitudinal direction of the through hole 61. Note that a state as above where movement of the through hole in any direction relative to the protruding portion of the film fixing mechanism 6 is regulated is referred to as "fixed." Meanwhile, a state where the through hole is held by the protruding portion and movement in any direction (here, the longitudinal direction) is permitted is referred to as "supported."

Figure 11B:
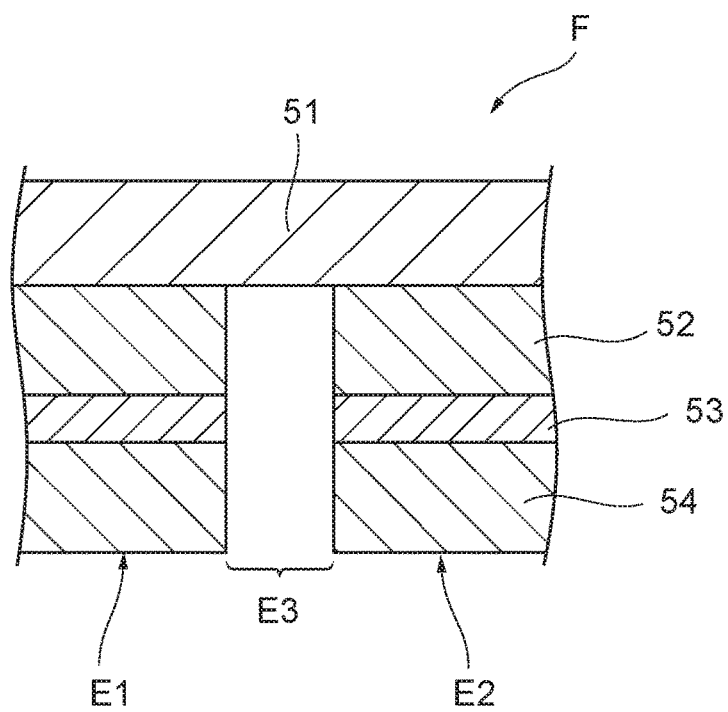

As illustrated in FIG. 11(*b*), the film F is provided with an application film 51, a substrate layer 52, an adhesive layer 53, and a release layer 54 in this order. A thickness of the film F is 50 μm to 1 mm, a width of the film F is 200 mm to 800 mm, and a dimension of the film F in the longitudinal direction is 1,000 mm to 3,000 mm. Note that in the present specification, this is described as a layered structure; however, as a number of layers, various forms may be adopted. For example, another layer may be stacked, such as stacking a design layer between the substrate layer 52 and the application film 51 to improve a design.

The substrate layer 52 is, for example, a polymer component such as a synthetic resin molded into a thin film shape and is configured by polyvinyl chloride or polyurethane. The substrate layer 52 configures a design surface of the application target surface S. The adhesive layer 53 is configured by an acrylic adhesive, a urethane adhesive, or the like. The adhesive layer 53 is a portion applied to the application target surface S. The release layer 54 is configured by, for example, a cellulose resin or a silicone resin. The release layer 54 is applied to the adhesive layer 53 and is released from the adhesive layer 53 immediately before applying the film F on the application target surface S. The application film 51 is configured, for example, by an olefin resin or polyurethane. The application film 51 protects the substrate layer 52 until immediately before film application, is applied on a decorative surface of the substrate layer 52, and is separated from the decorative surface after the film F is applied on the application target surface S. Note that at a boundary portion E3 between the applying region E1 and the non-applying region E2, a portion where the substrate layer 52, the adhesive layer 53, and the release layer 54 are removed is formed along an outline of the applying region E1. In this manner, the substrate layer 52 in the applying region E1 and the substrate layer 52 in the non-applying region E2 are both supported by the application film 51. Note that the boundary portion E3 is not limited to a slit-shaped configuration as described above and may be configured by a perforation; a form is not limited in particular.

Next, an applying method of applying the film F on the application target surface S of the application target object M is described. The applying method of the film F is provided with a preparing step of supporting the film F by the film support portion 2 and an applying step of applying the film F supported by the film support portion 2 on the application target surface S.

In the preparing step, the worker disposes the film support portion 2 in the position P2 illustrated in FIG. 5 and inserts each protruding portion configuring the long-side portion 6A and the short-side portion 6B of the film fixing mechanism 6 into each through hole of the fixing target portions T1, T2 and the support target portions T3, T4 of the film F. By this, the film F enters a state of being supported by each support body 2A, 2B, 2C. Moreover, the worker imparts an appropriate tension to the film F by moving at least the movable member 17A or 17B via the tension generation mechanism 7A, 7B. Once tension imparting work is completed, the movable members 17A, 17B are positioned by operating the handle portion 36*b* to fix the guiding target member 33 by the projecting portion 36*a* (see FIG. 8(*b*)). After this work is ended, the release layer 54 of the applying region E1 of the film F is released to expose the adhesive layer 53 (see FIG. 11(*b*)). Next, by lowering an entirety of the film support portion 2, the worker disposes the film support portion 2 in the position P3 illustrated in FIG. 5 and moves on to the applying step.

The applying step is provided with a first step of applying the film F on the application target surface S by the first support body 2A, a second step of changing an angle of the support body 2B relative to the first support body 2A so as to bring the second support body 2B closer to the application target surface S and applying the film F on the application target surface S, and a third step of changing an angle of the third support body 2C relative to the first support body 2A so as to bring the third support body 2C closer to the application target surface S and applying the film F on the application target surface S by the third support body 2C. Moreover, the second step and the third step are executed after the first step. With the second step and the third step, either may be performed first, or both steps may be performed simultaneously. When executing the second step and the third step, the worker operates the handle portion 82 of the angle changing mechanisms 4A, 4B to release engagement by the protruding portion 78 (see FIG. 6(*a*)). That is, application of the film F on the application target surface S is executed by the first step, the second step, and the third step, respectively. Once application of the film F on the application target surface S is completed, the worker, by peeling the application film 51 from the substrate layer 52 in the applying region E1, removes the substrate layer 52 and the like of the non-applying region E2 together with the application film 51. By the above, application of the film F on the application target surface S is completed.

Next, actions and effects of the applying device 1, the applying method, and the film F according to the present embodiment are described.

According to the applying device 1 according to the present embodiment, the film support portion 2 can support the film F by the first support body 2A and the second support body 2B along the Y-axis direction. In this state, using the first angle changing mechanism 4A, the angle around the axis line extending so as to intersect the Y-axis direction between the first support body 2A and the second support body 2B can be changed. Therefore, enabled is application of the film F upon adjusting the angle between the first support body 2A and the second support body 2B to match a shape of the application target surface S along the Y-axis direction. For example, the application target surface S according to the present embodiment is long in the Y-axis direction and curves gently along the Y-axis direction. The application target surface S has a curvature in a biaxial direction; for example, a curvature radius in the Y-axis direction is 1,000 mm, and a curvature radius in the X-axis direction is 200 mm. In particular, in an example, the application target surface S has an angle close to 90° even when viewed from the Y-axis direction and has a three-dimensional shape having planes facing the Z-axis direction and the X-axis direction. With such a shape, for example, where an angle in the Y-axis direction cannot be modified as in a conventional film support portion, easy application is difficult. In contrast, according to the configuration of the present embodiment, by the applying device 1 adjusting the angle of the second support body 2B to match this curvature, the worker can easily and speedily perform application of the film. By the above, application of the film F on the application target surface S can be speedily performed, and a quality of a finish can be improved.

In the applying device 1 according to the present embodiment, the film support portion 2 may be provided with the third support body 2C on the opposite side of the second support body 2B relative to the first support body 2A and the second angle changing mechanism 4B that changes the angle around the axis line extending so as to intersect the Y axis between the first support body 2A and the third support body 2C. According to such a configuration, angle adjustment can be performed to match the shape of the application target surface S even in the third support body 2C on the opposite side of the second support body 2B.

In the applying device 1 according to the present embodiment, the tension generation mechanisms 7A, 7B that impart tension to the film F supported by the film support portion 2 may be provided on the end portion in the Y-axis direction of the film support portion 2. According to such a configuration, application can be performed in a state where appropriate tension is imparted to the film F supported by each support body 2A, 2B, 2C along the Y-axis direction.

In the applying device 1 according to the present embodiment, the first angle changing mechanism 4A may change the angle between the first support body 2A and the second support body 2B to the first angle and the second angle less than the first angle. According to such a configuration, in a situation where the application target surface S has a shape that curves so as to swell to a vehicle-width-direction outer side, as illustrated in FIG. 4, application of the film F can be performed at an angle corresponding to the application target surface S by changing the angle between the first support body 2A and the second support body 2B to the second angle. Meanwhile, when supporting the film F by the film support portion 2, as illustrated in FIG. 3, the film F can easily be fixed by setting the angle to the first angle (that is, the first support body 2A and the second support body 2B line up straight).

The applying device 1 according to the present embodiment may be further provided with the installation portion 3 installed to the application target object M, wherein the first support body 2A is disposed in the X-axis direction intersecting the Y-axis direction on the installation portion 3 and rotatably supported by the installation portion 3. According to such a configuration, in a state where the film support portion 2 is installed to the application target object M via the installation portion 3, application of the film F becomes possible by merely performing fixing work and the like of the film F on the film support portion 2 and rotating the first support body 2A relative to the installation portion 3.

The applying method according to the present embodiment is an applying method of applying the film F on the application target surface S of the application target object M, provided with: the applying step of applying the film F, which is supported by the film support portion 2 provided with the first support body 2A and the second support body 2B lined up in the Y-axis direction, on the application target surface S. The applying step is provided with the first step of applying the film F on the application target surface S by the first support body 2A and the second step of applying the film F on the application target surface S by changing the angle of the support body 2B relative to the first support body 2A so as to bring the second support body 2B closer to the application target surface S.

According to such an applying method, actions and effects similar to those of the applying device 1 described above can be obtained.

In the applying method according to the present embodiment, the film support portion 2 is provided with the third support body 2C on the opposite side of the second support body 2B relative to the first support body 2A and the applying step is provided with the third step of applying the film F on the application target surface S by the third support body 2C. Moreover, the second step and the third step may be executed after the first step. According to such a method, according to such a configuration, angle adjustment can be performed to match the shape of the application target surface S even in the third support body 2C on the opposite side of the second support body 2B.

The film F according to the present embodiment is the film F applied to the application target surface S of the application target object M, wherein the film F is provided with the application film 51, the substrate layer 52, and the adhesive layer 53 in this order and extends in the longitudinal direction. It has the applying region E1 applied on the application target surface S and the non-applying region E2 not applied on the application target surface S, and has, in the non-applying region E2, the support target portions T3, T4 formed on both end portions along the longitudinal direction and the fixing target portions T1, T2 formed on both end portions in the longitudinal direction.

According to such a form, it becomes possible to perform speedy application on the application target surface S using an applying device 1 such as is described above. Moreover, because the fixing target portions T1, T2 are formed on both end portions in the longitudinal direction and the support target portions T3, T4 are formed on both end portions along the longitudinal direction, adjustment of tension in the longitudinal direction on the film F becomes possible.

In the film F according to the present embodiment, the support target portions T3, T4 may have the plurality of through holes 61, 62 for support formed in both end portions along the longitudinal direction, the through hole 62 disposed in the reference position CL in the longitudinal direction may be configured by the circular hole, and the through hole 61 disposed in the position other than the reference position CL in the longitudinal direction may be configured by the long hole extending along the longitudinal direction. According to such a configuration, when the protruding portions of the film fixing mechanism 6 are inserted into each through hole 61, 62, the position is fixed at the circular through hole 62 disposed in the reference position CL while movement in the Y-axis direction is permitted in the through hole 61 configured by the long hole. Therefore, fine-tuning of the position in each through hole 61 becomes possible when adjusting tension by the tension generation mechanisms 7A, 7B.

In the present embodiment, the film support portion 2 is configured as a frame-shaped frame body. That is, frame members are had in an edge portion, and a hollow shape is had near a central position. In a situation of adopting this shape, squeegeeing of the film F by a squeegee can be performed in a state where the film support portion 2 is pressed down, and application of the film F on the application target surface S can be made more steady. Note that the shape of the film support portion 2 does not have to be the frame-shaped frame as in the embodiment and may be a tabular shape where a vicinity of a central position is not hollow.

The present invention is not limited to the embodiment described above.

For example, in the embodiment described above, the film support portion is supported by the installation portion installed to the application target object M. However, the installation portion may be omitted. For example, the film support portion may be supported by a robot arm or the like, and the film support portion may be conveyed to a position of the application target surface.

Furthermore, the application target object M is not limited to a vehicle and may be a ship, a building, a home appliance, or the like. Moreover, the shape of the application target surface is also not limited to a shape such as that of the embodiment described above. For example, it may be an application target surface where the angle is adjusted so the second support body 2B and the third support body 2C are inclined toward the outer side in the vehicle-width direction.

Furthermore, in the embodiment described above, the support target portions T3, T4 are formed by the plurality of through holes 61 being configured by the long hole in the end portion along the longitudinal direction of the film F. However, a portion or an entirety of the through holes of this portion may be circular. For example, in a situation where all the through holes in the film F are circular, each protruding portion in the long-side portion 6A on a film-fixing-mechanism 6 side may be made slidable in the Y-axis direction. Alternatively, the through hole 63 in the end portion in the longitudinal direction of the film F may be made a long hole extending in the longitudinal direction. In this situation, a tension generation mechanism having a configuration independent from that of the film fixing mechanism 6 may be provided (for example, a mechanism that pulls in the longitudinal direction by gripping the end portion of the film F may be provided separately from the film fixing mechanism). Note that the shape of the through hole of the film F is also not limited in particular. For example, it may be a polygonal shape such as a triangle or any manner of shape such as an ellipse. However, in a situation where the through hole is circular, positioning and workability can be improved.

Furthermore, to more reliably perform application of the film F on the application target surface S, the worker may press the film F on the application target surface S using a squeegee or the like, but using the squeegee is optional.

The invention claimed is:

1. An applying method of applying a film on an application target surface of an application target object, comprising:
    an applying step of applying the film, which is supported by a film support portion provided with a first support body and a second support body lined up in a first direction on the application target surface, the first support body and second support body pivotally coupled to each other by a hinge portion; wherein
    the applying step is provided with
        a first step of applying the film on the application target surface by the first support body and
        a second step of applying the film on the application target surface by changing an angle of the second support body relative to the first support body through rotation of the second support body about the hinge portion so as to bring the second support body closer to the application target surface.

2. The applying method according to claim 1, wherein the film support portion is provided with a third support body on an opposite side of the second support body relative to the first support body,
    the applying step is provided with a third step of applying the film on the application target surface by the third support body, and
    the second step and the third step are executed after the first step,
    has an applying region applied on the application target surface and a non-applying region not applied on the application target surface; and
    has, in the non-applying region, a support target portion formed on both end portions along the longitudinal direction and a fixing target portion formed on both end portions in the longitudinal direction.

3. The applying method according to claim 1, wherein a film fixing mechanism is provided on the first support body and the second support body, and further comprising the step of fixing the film along the first direction using the film fixing mechanism.

4. The applying method according to claim 1, further comprising the step of imparting tension to the film supported by the film support portion.

5. The applying method according to claim 1, further comprising the step of changing the angle between the first support body and the second support body into a first angle and a second angle less than the first angle.

6. The applying method according to claim 1, wherein the film applied on the application target surface of the application target object is provided with:
    an application film, a substrate layer, and an adhesive layer in this order and extends in a longitudinal direction;
    has an applying region applied on the application target surface and a non-applying region not applied on the application target surface; and
    has, in the non-applying region, a support target portion formed on both end portions along the longitudinal direction and a fixing target portion formed on both end portions in the longitudinal direction.

7. The applying method according to claim 6, wherein the support target portion has a plurality of through holes for support formed in both end portions along the longitudinal direction, a through hole disposed in a reference position in the longitudinal direction is configured by a circular hole, and a through hole disposed in a position other than the reference position in the longitudinal direction is configured by a long hole extending along the longitudinal direction.

* * * * *

UNITED STATES PATENT AND TRADEMARK OFFICE
CERTIFICATE OF CORRECTION

PATENT NO. : 10,766,188 B2
APPLICATION NO. : 15/742405
DATED : September 8, 2020
INVENTOR(S) : Takayoshi Fujino et al.

Page 1 of 1

It is certified that error appears in the above-identified patent and that said Letters Patent is hereby corrected as shown below:

In the Claims

<u>Column 16</u>
Lines 14-21, delete the following:
"step,
has an applying region applied on the application target
    surface and a non-applying region not applied on the
    application target surface; and
has, in the non-applying region, a support target portion
    formed on both end portions along the longitudinal
    direction and a fixing target portion formed on both end
    portions in the longitudinal direction."
and insert -- step. --, therefore.

Signed and Sealed this
Twentieth Day of October, 2020

Andrei Iancu
*Director of the United States Patent and Trademark Office*